(12) United States Patent
Park et al.

(10) Patent No.: US 8,514,448 B2
(45) Date of Patent: Aug. 20, 2013

(54) IMAGE REVISING METHOD, IMAGE FORMING APPARATUS AND METHOD FOR REVISING IMAGE SPREADING

(75) Inventors: In-ho Park, Suwon-si (KR); Hyun-soo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 695 days.

(21) Appl. No.: 12/358,340

(22) Filed: Jan. 23, 2009

(65) Prior Publication Data

US 2010/0033737 A1 Feb. 11, 2010

(30) Foreign Application Priority Data

Aug. 8, 2008 (KR) ........................ 10-2008-0077812

(51) Int. Cl.
*H04N 1/60* (2006.01)

(52) U.S. Cl.
USPC ............................................. 358/1.9; 358/2.1

(58) Field of Classification Search
USPC ........... 358/1.9, 518, 521, 527, 2.1; 382/162, 382/167
See application file for complete search history.

(56) References Cited

U.S. PATENT DOCUMENTS

| | | | |
|---|---|---|---|
| 6,361,144 B1 * | 3/2002 | Torpey et al. | 347/43 |
| 6,753,976 B1 * | 6/2004 | Torpey et al. | 358/1.9 |
| 6,778,300 B1 * | 8/2004 | Kohler | 358/529 |
| 6,987,588 B2 * | 1/2006 | Yao et al. | 358/3.14 |
| 7,142,710 B2 * | 11/2006 | Hung | 382/162 |
| 7,161,710 B1 * | 1/2007 | MacLeod | 358/1.9 |
| 7,173,734 B2 * | 2/2007 | Klassen et al. | 358/1.9 |
| 7,180,633 B2 * | 2/2007 | Okamoto | 358/1.9 |
| 7,227,666 B1 * | 6/2007 | MacLeod | 358/1.9 |
| 7,234,791 B2 * | 6/2007 | Couwenhoven et al. | 347/15 |
| 7,245,763 B2 * | 7/2007 | Dyer | 382/167 |
| 2002/0163527 A1 * | 11/2002 | Park | 345/594 |
| 2003/0011794 A1 * | 1/2003 | Yao et al. | 358/1.9 |
| 2004/0257318 A1 * | 12/2004 | Itoh | 345/87 |
| 2007/0181027 A1 * | 8/2007 | Kanazawa | 101/484 |
| 2008/0007752 A1 * | 1/2008 | Gandhi et al. | 358/1.9 |

FOREIGN PATENT DOCUMENTS

| | | |
|---|---|---|
| JP | 2001-24899 | 1/2001 |
| JP | 2004-34636 | 2/2004 |
| JP | 2007-210303 | 8/2007 |
| JP | 2007-313815 | 12/2007 |

OTHER PUBLICATIONS

Korean Office Action mailed Feb. 14, 2013 for corresponding Korean Application No. 10-2008-0077812.
Office Action, dated July. 1, 2013, in corresponding U.S. Appl. No. 13/861,145 (13 pp.).

* cited by examiner

*Primary Examiner* — Marivelisse Santiago Cordero
*Assistant Examiner* — Moustapha Diaby
(74) *Attorney, Agent, or Firm* — Staas & Halsey LLP

(57) ABSTRACT

An image revising method, an image forming apparatus, and a method for revising image spreading are provided. The image revising method includes regulating a black color level in a black area of an input image; adjusting a color level of at least one other color excluding the black color in the black area; and revising the image by applying the regulated black color level and the adjusted color level of the at least one other color. Thus, in copying a document, the black color with the enhanced legibility can be serviced.

16 Claims, 10 Drawing Sheets
(7 of 10 Drawing Sheet(s) Filed in Color)

IMAGE REVISING METHOD, IMAGE FORMING APPARATUS AND METHOD FOR REVISING IMAGE SPREADING

CROSS-REFERENCE TO RELATED APPLICATION

This application claims the benefit of Korean Patent Application No. 2008-77812, filed Aug. 8, 2008 in the Korean Intellectual Property Office, the disclosure of which is incorporated herein by reference.

BACKGROUND OF THE INVENTION

1. Field of the Invention

Aspects of the present invention relate generally to an image revising method, an image forming apparatus, and a method for revising an image spreading. More particularly, aspects of the present invention relate to an image revising method and an image forming apparatus for enhancing a copy quality of a document including a black color, and a method for revising an image spreading.

2. Description of the Related Art

Generally, a copy process incorporates a scanning process and a printing process. In the copy process, there are two factors which deteriorate the image quality. One factor is hardware fault, that is, misregistration error of the Cyan, Magenta, Yellow and Key (CMYK) color model because of defects in a scanner motor and a printer engine, and the other factor is mismatch of black points when a printer uses a lookup table. When the misregistration error occurs in copying a document having black text, legibility of the black text deteriorates and the consumption of cyan, magenta, and yellow inks increases against the consumption of the black ink. As a result, the yield of the ink (or the toner) is problematic.

To raise the legibility of the black text, a conventional method emphasizes the black text by intensifying the black offset in a 1D lookup table. However, the conventional method for intensifying the black offset causes the problem in the ink yield and hardly addresses the misregistration error.

SUMMARY OF THE INVENTION

Aspects of the present invention are provided to solve the above-mentioned and/or other problems and disadvantages and aspects of the present invention provide an image revising method and an image forming apparatus for calibrating a black value in a lookup table and adjusting levels of other colors excluding the black color in a black area, and a method for revising image spreading According to an aspect of the present invention, an image revising method includes regulating a black color level in a black area of an input image; adjusting a color level of at least one other color excluding the black color in the black area; and revising the image by applying the regulated black color level and the adjusted color level of the at least one other color.

According to an aspect of the invention, the regulating comprises regulating the black color level based on a preset reference black color level.

According to an aspect of the invention, a black color level exceeding the reference black color level is regulated to not exceed the reference black color level.

According to an aspect of the invention, the image revising method further includes compensating for the black color level based on an adjustment of the adjusted at least one other color. The revising of the image comprises revising the image by further applying the compensated black color level.

According to an aspect of the invention, the image revising method further includes extracting a brightness of the black area. The regulating of the black color level determines whether the black color level in the black area exceeds the reference black color level by using the extracted brightness of the black area.

According to an aspect of the invention, the adjusting of the color level comprises lowering the color level of each color at a preset removal ratio in order of magenta, cyan, and yellow.

According to an aspect of the invention, the image revising method further includes outputting the revised image; inputting an adjustment of the at least one other color excluding the black based on color misregistration error per color of the output revised image; calibrating the at least one other color excluding the black color based on the input adjustment; and revising the output revised image by applying the calibrated at least one other color.

According to an aspect of the invention, the adjustment is inputted according to a separation degree of each color from an outline of the black area, among the at least one other color excluding the black color.

According to an aspect of the invention, the other color levels may be calibrated based on the following equation:

$$P'_r = P_r + G(S_r) \times (1 - P_r)$$

$$C' = C_0 \times P'_r$$

$$M' = M_0 \times P'_r$$

$$Y' = Y_0 \times P'_r$$

if $L < L_{th}$, $$C_{new} = C' \times \frac{L}{255 - (L \times P_c) + P_{r2}}$$

$$M_{new} = M' \times \frac{L}{255 - (L \times P_m) + P_{r2}}$$

$$Y_{new} = Y' \times \frac{L}{255 - (L \times P_y) + P_{r2}}$$

$L \geq L_{th}$, $$C_{new} = C'$$

$$M_{new} = M'$$

$$Y_{new} = Y'$$

where $P_r$ denotes a total CMY adjustment coefficient, $G(S_r)$ denotes a preset Gaussian coefficient, $P_r'$ denotes the total CMY adjustment coefficient in consideration of the Gaussian coefficient, $C_0$, $M_0$, and $Y_0$ denote initial CMY color levels, C', M' and Y' denote the CMY adjusted by $P_r$, $P_c$, $P_m$ and $P_y$ denote an adjustment ratio of the input color levels, L denotes the brightness value of the black area, $L_{th}$ denotes an adjusted black color level, $P_{r2}$ denotes an additional CMY adjustment coefficient over the preset initial black color level, and $C_{new}$, $M_{new}$ and $Y_{new}$ denote the adjusted CMY.

According to an aspect of the invention, the black color level may be compensated based on the following equation:

$$C_{diff} = C_0 - C_{new}$$

$$M_{diff} = M_0 - M_{new}$$

$$Y_{diff} = Y_0 - Y_{new}$$

$$CMY_{max} = MAX(C_{diff}, M_{diff}, Y_{diff})$$

$$K_{new} = K_0 + P_k \times CMY_{max}$$

where $C_0$, $M_0$, $Y_0$ and $K_0$ denote initial CMYK values, $C_{new}$, $M_{new}$, $Y_{new}$ and $K_{new}$ denote the regulated CMYK color levels, $C_{diff}$, $M_{diff}$ and $Y_{diff}$ denote the CMY adjustment, and $P_k$ denotes a preset black compensation coefficient.

According to the another aspect of the present invention, an image forming apparatus includes a black regulator to regulate a black color level in a black area of an input image; a color regulator to adjust other color levels of other colors excluding the black in the black area; and an image reviser to revise the image by applying the regulated black color level and the adjusted other color levels to the input image.

According to one aspect of the invention, the black regulator regulates the black color level based on a preset reference black color level.

According to one aspect of the invention, the black regulator regulates a black color level exceeding the reference black color level, so as to not exceed the reference black color level.

According to one aspect of the invention, the black regulator compensates for the black color level based on an adjustment of the adjusted other color levels, and the image reviser revises the image by further applying the compensated black color level.

According to one aspect of the invention, the image forming apparatus further includes a brightness extractor extract a brightness of the black area. The black regulator may determine whether the black color level in the black area exceeds the reference black color level by using the brightness extracted by the brightness extractor.

According to one aspect of the invention, the color regulator lowers the other color levels of each color at a preset removal ratio in order of magenta, cyan, and yellow.

According to one aspect of the invention, the image forming apparatus further includes a printer part to output the revised image; and a user interface to input an adjustment of the other colors excluding the black color based on color misregistration error per color of the output revised image. The color regulator calibrates the other colors excluding the black color based on the input adjustment, and the image reviser revises the output revised image by applying the calibrated other colors.

According to one aspect of the invention, the adjustment is inputted according to separation degree of each color from an outline of the black area, among the other colors excluding the black color.

According to one aspect of the invention, the color regulator may calibrate the other color levels based on the following equation:

$$P'_r = P_r + G(S_r) \times (1 - P_r)$$

$$C' = C_0 \times P'_r$$

$$M' = M_0 \times P'_r$$

$$Y' = Y_0 \times P'_r$$

if $L < L_{th}$, $$C_{new} = C' \times \frac{L}{255 - (L \times P_c) + P_{r2}}$$

$$M_{new} = M' \times \frac{L}{255 - (L \times P_m) + P_{r2}}$$

$$Y_{new} = Y' \times \frac{L}{255 - (L \times P_y) + P_{r2}}$$

$L \geq L_{th}$, $C_{new} = C'$ $M_{new} = M'$ $Y_{new} = Y'$ where $P_r$ denotes a total CMY adjustment coefficient, $G(S_r)$ denotes a preset Gaussian coefficient, $P_r'$ denotes the total CMY adjustment coefficient in consideration of the Gaussian coefficient, $C_0$, $M_0$, and $Y_0$ denote initial CMY color levels, C', M' and Y' denote the CMY adjusted by $P_r$, $P_c$, $P_m$ and $P_y$, denote an adjustment ratio of the input color levels, L denotes the brightness value of the black area, $L_{th}$ denotes an adjusted black color level, $P_{r2}$ denotes an additional CMY adjustment coefficient over the preset initial black color level, and $C_{new}$, $M_{new}$ and $Y_{new}$ denote the adjusted CMY.

According to one aspect of the invention, the black regulator compensates the black color level based on the following equation:

$$C_{diff} = C_0 - C_{new}$$

$$M_{diff} = M_0 - M_{new}$$

$$Y_{diff} = Y_0 - Y_{new}$$

$$CMY_{max} = MAX(C_{diff}, M_{diff}, Y_{diff})$$

$$K_{new} = K_0 + P_k \times CMY_{max}$$

where $C_0$, $M_0$, $Y_0$ and $K_0$ denote initial CMYK color levels, $C_{new}$, $M_{new}$, $Y_{new}$ and $K_{new}$ denote the regulated CMYK, $C_{diff}$, $M_{diff}$ and $Y_{diff}$ denote the CMY adjustment, and $P_k$ denotes a preset black compensation coefficient.

According to one aspect of the invention, according to an aspect of the present invention, a method for revising image spreading includes outputting an image; when the output image is spread, such that the spreading color is outside of a black color of a black area of the output image, inputting adjustment of a spreading color; calibrating the spreading color based on the input adjustment; and revising the image by applying the calibrated spreading color.

According to one aspect of the invention, the adjustment is inputted according to separation degree of each color from an outline of the black area, among the other colors excluding the black color in the black area of the image.

According to one aspect of the invention, the method further includes outputting the revised image; and when the spreading is not corrected in the output revised image, re-inputting the adjustment of the spreading color.

According to an aspect of the present invention, an image forming apparatus for revising an image includes a user interface for inputting adjustment of a color spreading, wherein a spreading color is outside a black color in a black area of an image; and a color regulator calibrating the spreading color based on the input adjustment.

According to one aspect of the invention, the user interface displays a level of each color based on the input adjustment.

According to one aspect of the invention, the image forming apparatus further includes an image reviser revising the image by applying the calibrated color; and a printer part for outputting the revised image.

According to one aspect of the invention, when the spreading is not corrected in the output revised image, the user interface again input the adjustment of the spreading color.

Additional aspects and/or advantages of the invention will be set forth in part in the description which follows and, in part, will be obvious from the description, or may be learned by practice of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects and advantages of the invention will become apparent and more readily appreciated from the following description of the embodiments, taken in conjunction with the accompanying drawings in which.

DETAILED DESCRIPTION OF THE EMBODIMENTS

Figure 1:
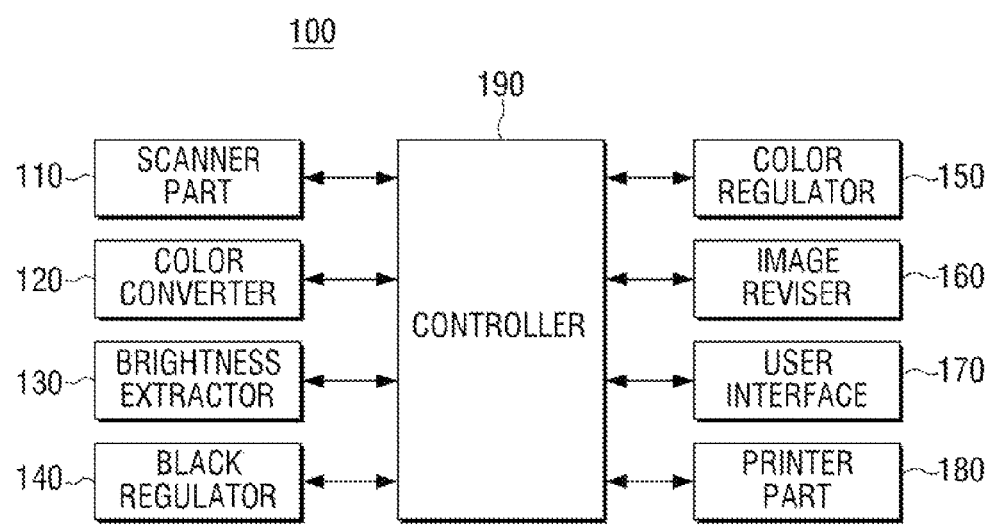
FIG. 1 is a block diagram of an image forming apparatus for revising an image according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image forming apparatus 100 for revising an image according to an exemplary embodiment of the present invention. The image forming apparatus 100 of FIG. 1 includes a scanner part 110, a color converter 120, a brightness extractor 130, a black regulator 140, a color regulator 150, an image reviser 160, a user interface 170, a printer part 180, and a controller 190. The image forming apparatus 100 can be a multifunction device including a copy function, and can also include a fax function, an optical character recognition (OCR) function, but is not limited thereto. Furthermore, the converter 120, extractor 120, regulators 140, 150, reviser 160, user interface 170, and the controller 190 can be implemented using one or more processors, executing computer software and/or firmware.

The scanner part 110, which performs the same operations as a general scanner, scans a document and inputs an image according to RGB coordinates. Herein, the input image includes a black area, and the black area can be a black text. However, the black area is not restricted to this example and the black area can be an image or picture. Furthermore, it is understood that the input image can be retrieved from a storage medium across a network, such as where the scanner part 110 is not included in the image forming apparatus 100 or where the image forming apparatus 100 receives the input image through email, a computer network or from a removable storage medium.

The image forming apparatus 100 is a multifunction device incorporating diverse functions in a single device. The scanner part 110 is used not only to scan a document but also to copy a document in association with the scanning operation and the printing operation, or in association with a faxing operation, an OCR operation, or other multifunction device operations.

The color converter 120 gamma-corrects the image input from the scanner part 110 and converts colors in relation with the RGB color coordinates. The color converter 120 converts the RGB color coordinates to CIELAB color coordinates for the operation of the scanner part 110. The color converter 120 also converts the CIELAB color coordinates to CMYK color coordinates for the operation of the printer part 180. The conversion from the RGB color coordinates to the CIELAB color coordinates concerns the scanning operation, and the conversion from the CIELAB color coordinates to the CMYK color coordinates concerns the printing operation. However, it is understood that other color coordinates can be used instead of or in addition to the CIELAB coordinates, and/or CYMK color coordinates.

The brightness extractor 130 extracts the brightness from the data output from the color converter 120. When the color converter 120 converts the RGB color coordinates to the CIELAB color coordinates, the brightness extractor 130 extracts the brightness value according to the L value of the CIELAB color coordinates. When the color converter 120 converts the RGB color coordinates to the YCbCr color coordinates, the brightness extractor 130 can extract the brightness value according to the Y value of the YCbCr color space. While the brightness value is used to ease the understanding, the actual brightness extracted at the brightness extractor 130 indicates the level of the brightness, rather than a specific value.

The black regulator 140 regulates the black value in the black area of the input image; that is, the image scanned by the scanner part 110, based on a preset reference black value. The reference black value is preset to avoid tone jumping in the output image.

To adjust the black value, the black regulator 140 uses the brightness extracted at the brightness extractor 130. Using the brightness value extracted at the brightness extractor 130, the black regulator 140 determines whether the black value of the black area exceeds the reference black value or not. When the black value of the black area does not exceed the reference black value, the black regulator 140 does not regulate the black value. When the black value of the black area exceeds the reference black value, the black regulator 140 calibrates the black value to the reference black value. Herein, a position of the black value in the lookup table is referred to as a black point.

The black regulator 140 modifies the black value in the lookup table which is used to represent the colors in the image forming apparatus 100. The black regulator 140 can reset the black value in the lookup table to make the brightness value of the black area '0'.

There can be various methods to modify the brightness value of the black area to '0', for example, a black offset method. The black offset method is well known in the art and shall not be described here.

When the color regulator 150 calibrates colors other than the black color, the black regulator 140 corrects the black value based on the other regulated colors. When all of the colors excluding the black color are removed from the black area, the legibility of the black increases but this causes the tone jump, which occurs along the contour of the image. The black value is corrected by the black regulator 140 to produce a smooth image without the tone jumping.

After the color regulator 150 controls the colors other than the black color, based on Equation 1, the black regulator 140 can compensate for the black value based on the other adjusted colors. A typical printer uses the CMYK color coordinates, but the invention is not limited to printers using the CMYK color coordinates. The image forming apparatus 100 also uses the CMYK color coordinates in the printing job, but is not limited thereto.

When the C (cyan), M (magenta) and Y (yellow) levels decrease, Equation 1 compensates for K (black) by taking into account the decrease of C, M and Y. A maximum value of the variations of C, M and Y reset from the initial C, M and Y is multiplied by a black color compensation coefficient and then added with the initial K value. The black regulator 140 corrects the black value using the K value acquired based on Equation 1.

$$C_{diff} = C_0 - C_{new}$$

$$M_{diff} = M_0 - M_{new}$$

$$Y_{diff} = Y_0 - Y_{new}$$

$$CMY_{max} = MAX(C_{diff}, M_{diff}, Y_{diff})$$

$$K_{new} = K_0 + P_k \times CMY_{max} \quad \text{Equation 1}$$

$C_0$, $M_0$, $Y_0$ and $K_0$ denote the initial CMYK values, $C_{new}$, $M_{new}$, $Y_{new}$ and $K_{new}$ denote the adjusted CMYK, $C_{diff}$, $M_{diff}$ and $Y_{diff}$ denote the CMY adjustment, and $P_k$ denotes the preset black compensation coefficient. Herein, the black compensation coefficient $P_k$ is preset, and $C_{new}$, $M_{new}$, and $Y_{new}$ can be acquired from the color regulator 150.

The color regulator 150 regulates the levels of the other colors, excluding the black color, in the black area of the image. That is, the color regulator 150 controls the CMY levels in the black area.

When the adjustments of CMY are not input from the user interface 170, the color regulator 150 can lower the level of each color according to a preset removal rate. The preset removal ratio increases in order of the magenta, the cyan, and the yellow colors because the magenta degrades the black legibility most in the misregistration error. Conversely, the cyan and the yellow have the relative low error. Accordingly, to emphasize the black area, it is preferable, but not required, to minimize the influence of the magenta on the image by removing the magenta component of the high misregistration error and leaving the cyan component and the yellow component.

When a user inputs the adjustments of C, M and Y through the user interface 170 the color regulator 150 controls C, M and Y based on the input CMY adjustments.

The misregistration error is the printing where at least one of C, M and Y colors deviates outward from the outline of the black area, which causes image spreading in the print output. The color regulator 150 is able to address the spreading in the misregistration error of each color.

While not restricted thereto, the color regulator 150 calibrates C, M and Y based on Equation 2.

$$P'_r = P_r + G(S_r) \times (1 - P_r) \quad \text{Equation 2}$$

$$C' = C_0 \times P'_r$$

-continued $$M' = M_0 \times P'_r$$

$$Y' = Y_0 \times P'_r$$

if $L < L_{th}$, $$C_{new} = C' \times \frac{L}{255 - (L \times P_c) + P_{r2}}$$

$$M_{new} = M' \times \frac{L}{255 - (L \times P_m) + P_{r2}}$$

$$Y_{new} = Y' \times \frac{L}{255 - (L \times P_y) + P_{r2}}$$

$L \geq L_{th}$, $$C_{new} = C'$$

$$M_{new} = M'$$

$$Y_{new} = Y'$$

$P_r$ denotes a total CMY adjustment coefficient, $G(S_r)$ denotes a preset Gaussian coefficient, $P'_r$ denotes the total CMY adjustment coefficient in consideration of the Gaussian coefficient, $C_0$, $M_0$, and $Y_0$ denote initial CMY values, and C', M' and Y' denote CMY adjusted by $P_r$, $P_c$, $P_m$ and $P_y$ denote an adjustment ratio of the input color, L denotes the brightness value of the black area, $L_{th}$ denotes an adjusted black value, $P_{r2}$ denotes an additional CMY adjustment coefficient over the preset initial black value, and $C_{new}$, $M_{new}$ and $Y_{new}$ denote the adjusted CMY. Herein, L is provided from the brightness extractor 130. When $C_{new}$, $M_{new}$, and $Y_{new}$ are acquired, $C_{new}$, $M_{new}$, and $Y_{new}$, can be fed to the black regulator 140 to compensate for the black value.

When the black regulator 140 controls the black value and the color regulator 150 controls C, M and Y, the image reviser 160 revises the image by applying the adjusted black value and CMY values. When the black regulator 140 compensates for the black value, the image reviser 160 revises the image by applying the compensated black value. When the image revised by the image reviser 160 does not satisfy the user, the image reviser 160 repeatedly revises the image.

The user interface 170 supports the interfacing between the image forming apparatus 100 and the user. The user interface 170 can provide the user with a color level control User Interface (UI) serviced by the image forming apparatus 100. The user interface 170 may receive the CMY adjustments from the user through the color level control UI 200. While not restricted thereto, the user interface 170 can be a display or touch screen display on the image forming apparatus 100, or can be an interface to communicate with a computer on which a user inputs the values and/or views the UI.

When the image forming apparatus 100 copies a document, the spreading in the image input through the scanner part 110 is corrected, to some degree, through the color converter 120, the brightness extractor 130, the black regulator 140, the color regulator 150, and the image reviser 160. The user can determine which the color is spread by examining the produced image, and control the color in person, which will be illustrated in detail further below with reference to FIGS. 2A through 2E.

The printer part 180 produces the image in the printing operation or the copy operation and the printer part 180 outputs the image revised at the image reviser 160.

The controller 190 controls the overall operation of the image forming apparatus 100. The controller 190 controls the signal input and output between the scanner part 110, the color converter 120, the brightness extractor 130, the black regulator 140, the color regulator 150, the image reviser 160, the user interface 170, and the printer part 180.

More particularly, when the brightness extractor 130 extracts the brightness value, the controller 190 provides the extracted brightness value to the black regulator 140 so that the black regulator 140 modifies the black value in the lookup table. For the adjustment of the colors other than the black color (that is, when C, M and Y adjustment is inputted through the user interface 170), the controller 190 controls the color regulator 150 to adjust the levels of C, M and Y according to the input adjustment. When the C, M and Y colors are adjusted by the color regulator 150, the controller 190 controls the black regulator 140 to compensate for the black color based on the adjustment of the C, M and Y colors. The black regulator 140 can compensate the black color based on Equation 1. When the image reviser 160 amends the image, the controller 190 controls the printer part 180 to output the revised image.

Figure 2A:
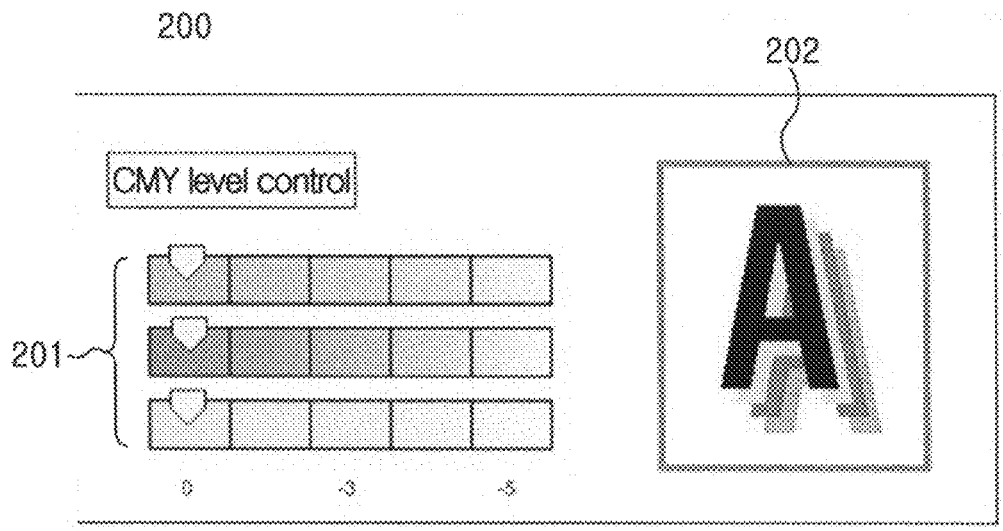
FIGS. 2A through 2E are diagrams showing a method for adjusting levels per color.

FIGS. 2A through 2E illustrate a method for adjusting the color level according to an aspect of the invention. FIG. 2A depicts the color level control user interface (UI) 200 provided on the user interface 170 to allow the user to control the color levels. In this embodiment, the UI 200 shows the CMYK colors used in the general printer. The user can arbitrarily control the CMY colors excluding the black color.

The color level control UI 200 of FIG. 2A can be displayed when the user inputs a request signal to display the color level control UI 200 through a manipulation key (not shown) of the image forming apparatus 100. When the color level control UI 200 of FIG. 2A is displayed on a user terminal (not shown) or a screen (not shown) of the image forming apparatus 100, the user can control the color levels by shifting the lever of the corresponding color in a color control bar 201 representing the C, M and Y colors. However, it is understood that other mechanisms can be used to control the color levels in addition to or instead of the shown color levels.

When the user moves one lever in the color control bar 201, the corresponding color of the moved lever is calibrated and produced in a color status window 202. For example, when the user decreases the cyan by 50% by shifting the lever in the color control bar 201, the color status window 202 shows the cyan character A lightened by 50%.

Figure 2B:
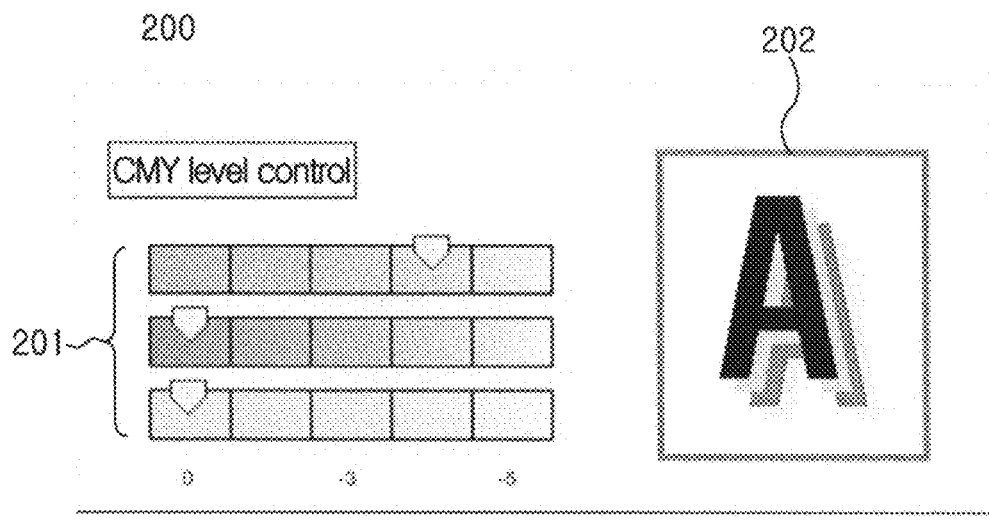

In FIG. 2A, when the blue color is spread outside the outline of the black area, the user moves the lever of the bar of the blue color as shown in FIG. 2B, that is, the cyan color among the three color control bars 201. As a result, the characters A in the black color, the yellow color, and the magenta color are the same as in the initial colors, whereas the cyan character A is lightened by the ratio adjusted by the user in the color status window 202.

Figure 2C:
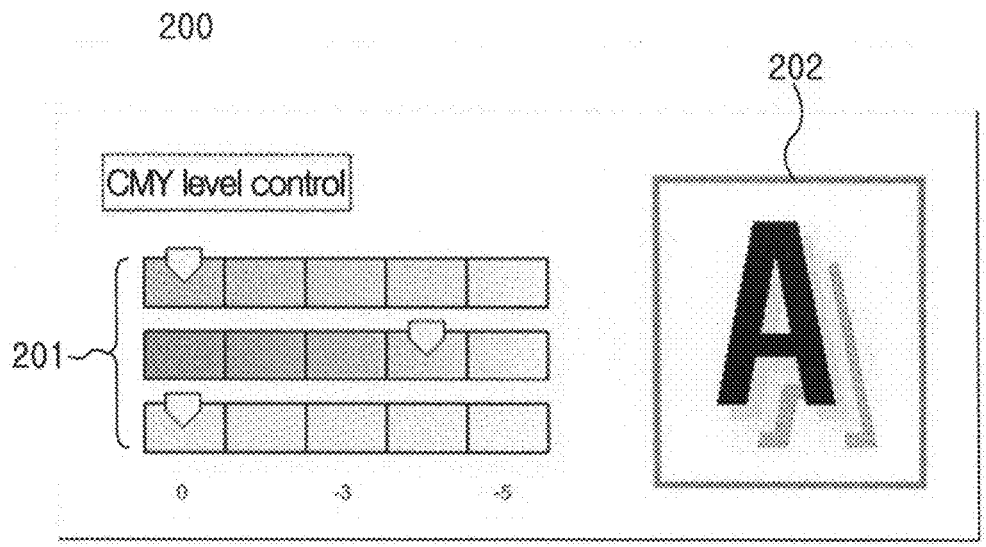

When the red color is spread outside the outline of the black area in FIG. 2A, the user moves the lever of the bar of the red color; that is, the magenta color among the three color control bars 201, as shown in FIG. 2C. As a result, the characters A in the black color, the yellow color, and the cyan color are the same as in the initial colors, whereas the magenta character A is lightened by the ratio adjusted by the user in the color status window 202.

Figure 2D:
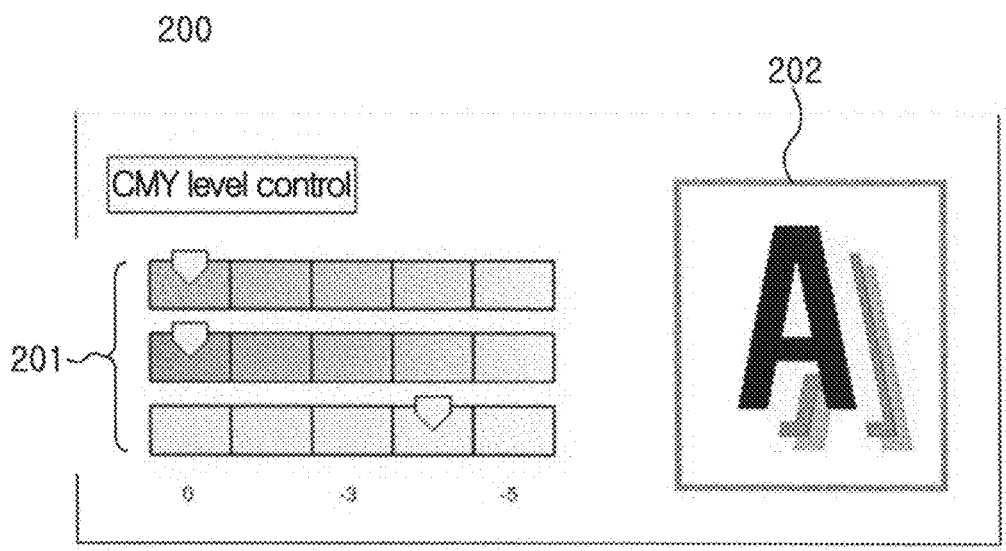

When the yellow color is spread outside the outline of the black area in FIG. 2A, the user moves the lever of the bar of the yellow color among the three color control bars 201, as shown in FIG. 2D. As a result, the characters A in the black color, the magenta color, and the cyan color are the same as in the initial colors, whereas the yellow-colored character A is lightened by the ratio adjusted by the user in the color status window 202.

Figure 2E:
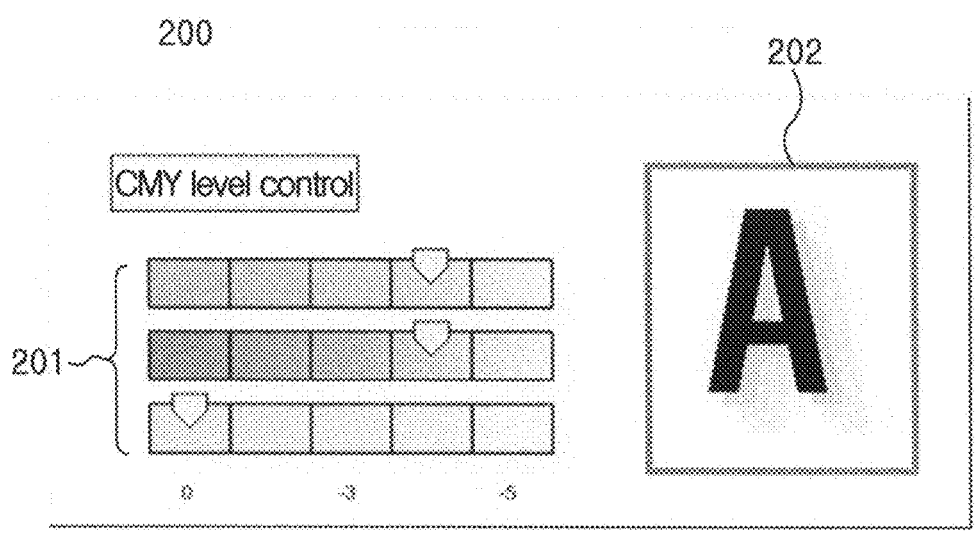

FIG. 2E depicts the spreading of the red color and the blue color outside the outline of the black area. The user can calibrate both the red color and the blue color in the three color control bars 201; that is, shift both of the levers of the magenta bar and the cyan bar. As a result, the characters A in the block color and the yellow color are the same as in the initial colors, whereas the magenta-colored character A and the cyan-colored character A are lightened by the ratio adjusted by the user in the color status window 202.

Notably, FIGS. 2A through 2D depict the color adjustment of the colors other than the black color, that is, one of the magenta, the cyan, and the yellow, and FIG. 2E depicts the color adjustment of two colors. Although it is not illustrated, each of the color levels of the magenta, the cyan, and the yellow can be adjusted together as well as independently.

When the user calibrates the color using the color control bar 201 as shown in FIGS. 2A through 2E, the adjustment of the calibrated color is reflected to $P_c$, $P_m$ and $P_y$ in Equation 2 used at the color regulator 150.

While the color control bar 201 is utilized to calibrate the levels of C, M and Y by way of example, the color level control UI 200 is not limited to this bar. It should be understood that the form of the color level control UI 200 is diverse and can be adjusted in appearance with consideration to the user's convenience.

Figure 3A:
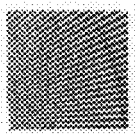
FIGS. 3A and 3B are diagrams showing black text revision results.
Figure 3B:
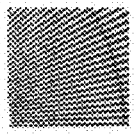

FIGS. 3A and 3B are diagrams showing black text revision results. FIG. 3A depicts a printout under the misregistration terror, which can be caused by the hardware fault, that is, error of the scanner motor and the printer engine. In the CMYK misregistration error, the outline of the text is vague and spread, as shown in FIG. 3A. In the worst case, the text may be viewed double.

When the user copies a document using the image forming apparatus 100 and the printout is produced under the misregistration error of C, M, Y and K as shown in FIG. 3A, the user can calibrate the spreading of the color; that is, one of the cyan, the magenta, and the yellow in the color level control UI 200 of FIG. 2A.

When the image reviser 160 amends the printout of the CMYK processing error by applying the colors calibrated at the black regulator 140 and the color regulator 150, the output of FIG. 3B can be yielded. As one can see in FIG. 3B, the spreading that occurs around the outline of the black text is calibrated and the text legibility is enhanced.

Figure 4A:
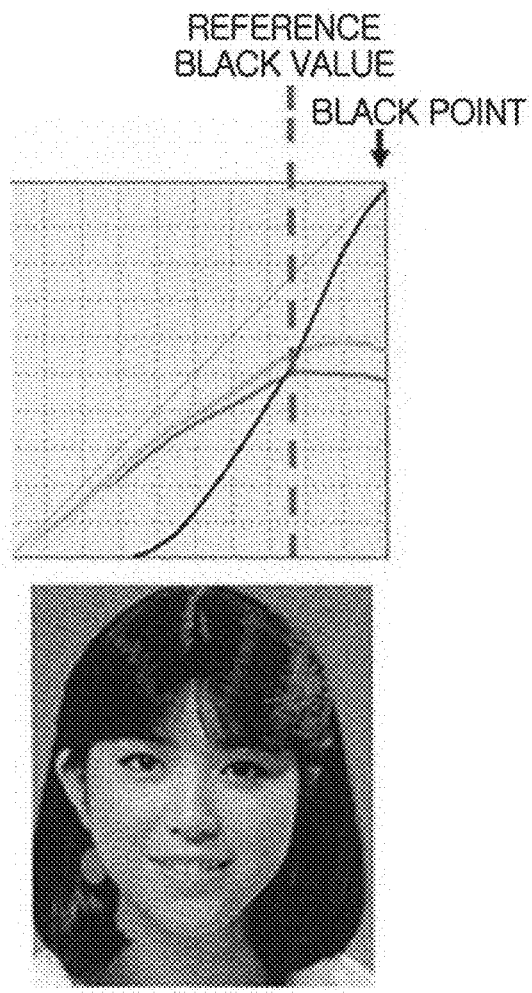
FIGS. 4A, 4B and 4C are diagrams showing Gray balance curve and resultant images according to whether a black value is regulated.
Figure 4B:
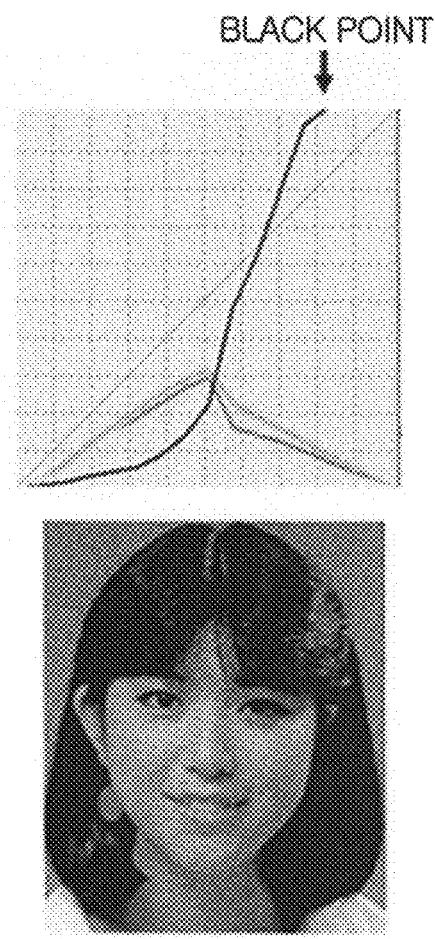
Figure 4C:
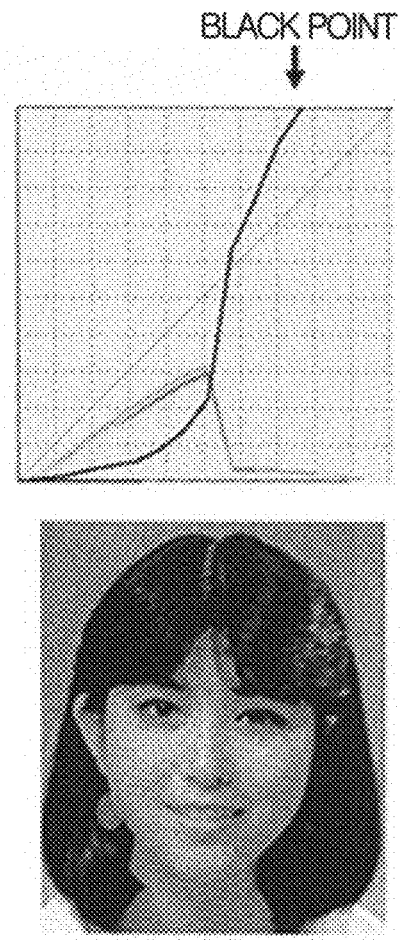

FIGS. 4A, 4B and 4C illustrate grey balance curves and resultant images according to whether a black value is regulated. FIG. 4A depicts a conventional grey balance curve (shown as the black line in the FIG. 4A) without the compensation of the black value. Namely, the color values in the image produced at the scanner part 110 are used. The black value exceeds the reference black value. In FIG. 4A, the black value is not calibrated and is too brightly produced because of the high mixing ratios of the other colors C, M and Y in the black area.

In FIG. 4B, the black value is modified to be approximately equal to the reference black value at the black regulator 140 and the ratios of the C, M and Y colors are lowered by the color regulator 150. Compared to the produced image of FIG. 4A, the produced image of FIG. 4B attains enhanced legibility for the black color.

In FIG. 4C, the black value is modified to be approximately equal to the reference black value at the black regulator 140 and the ratios of the C, M and Y colors are almost removed at the color regulator 150. Compared to the produced image of FIG. 4B, the black color is quite perfect but not natural. Also, the image outline is subject to the tone jumping.

Thus, when the color regulator 150 calibrates the C, M and Y colors, it is not preferred to nearly eliminate the C, M and Y colors. Preferably, the C, M and Y colors are calibrated at suitable ratios.

In conclusion, in producing the black area, it is not preferable to produce the black area merely with the black color but to mix C, M and Y at the proper ratios. In this exemplary embodiment, by appropriately adjusting the level of the spreading color in the black area, the smooth image can be produced without the tone jumping and the legibility of the black area can be improved.

Figure 5:
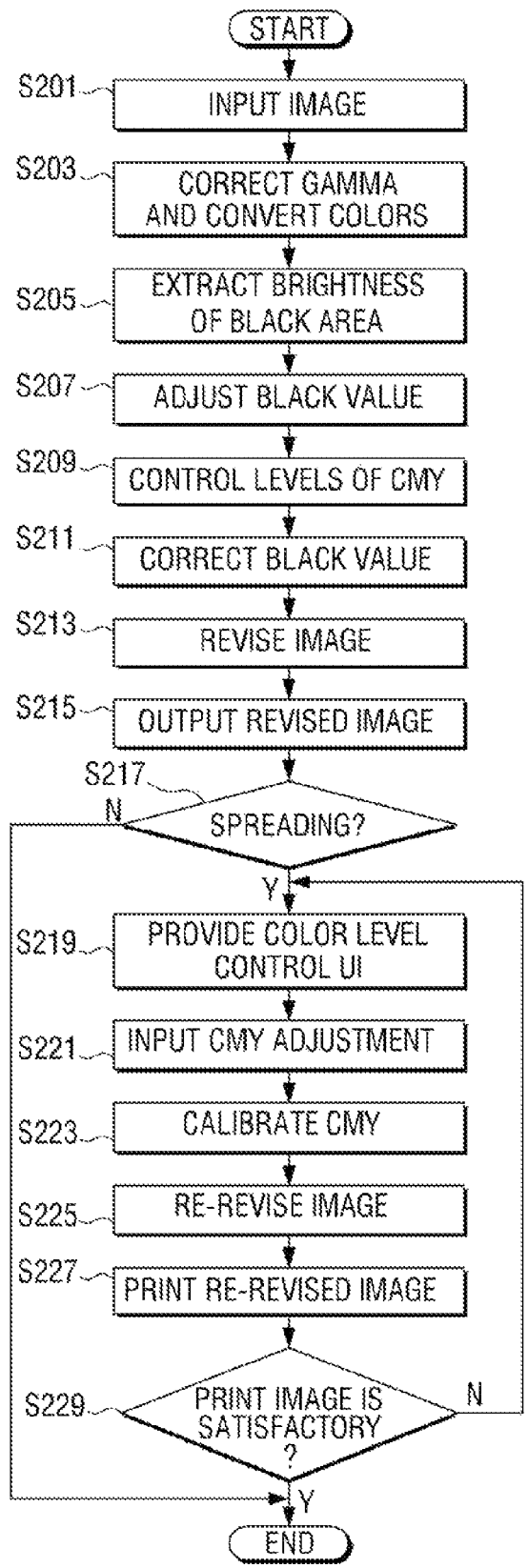
FIG. 5 is a flowchart outlining an image revising method according to an exemplary embodiment of the present invention.

FIG. 5 is a flowchart outlining an image revising method according to an exemplary embodiment of the present invention. To copy the document, including the black text, the user inputs the document to the image forming apparatus 100 and inputs a copy command using the manipulation key. The scanner part 110 scans the inserted document and produces the scanned image using RGB values (S201).

The color converter 120 conducts the gamma correction and the color conversion for the scanner using the RGB values input from the scanner part 110 (S203). The color converter 120 converts the RGB values to the CIELAB color coordinates.

The brightness extractor 130 extracts the brightness value of the black text from the CIELAB color coordinates acquired at the color converter (S205). The black regulator 140 adjusts the black value so as to not exceed the reference black value using the brightness value extracted by the brightness extractor 130 (S207).

The color regulator 150 controls the levels of C, M and Y of the black text by applying the preset values (S209). The black regulator 140 corrects the black value based on the adjustment of C, M and Y controlled by the color regulator 150 (S211).

The image reviser 160 revises the image based on the black value adjusted by the black regulator 140 and the C, M and Y color values adjusted by the color regulator 150 (S213). The printer part 180 produces the image revised by the image reviser 160 (S215).

When the image is output, the user can visually check on the spreading in the output image. Upon detecting the spreading (S217-Y), the user can input the request signal to display the color level control UI 200 using the manipulation key. Upon receiving the request signal to display the color level control UI 200 from the user, the user interface 170 provides the color level control UI 200 of FIG. 2A (S219).

In the color level control UI 200, the user calibrates the spreading color of the output image at the intended ratio. The color level adjustment by the user is input to the color regulator 150 (S221). The color regulator 150 controls the color levels by applying the color level adjustment input by the user to $P_c$, $P_m$ and $P_y$ of Equation 2 (S223). The color levels calibrated by the color regulator 150 are fed to the image reviser 160 to revise the image (S225).

The image color-calibrated by the user's setting is produced by the printer part 180 (S227). The user determines whether the output image is satisfactory (S229). When the output image is not satisfactory (S229-N), the image forming apparatus 100 returns to step 219 to receive the level adjustment from the user. When the output image is satisfactory (S229-Y), the process is finished.

Figure 6:
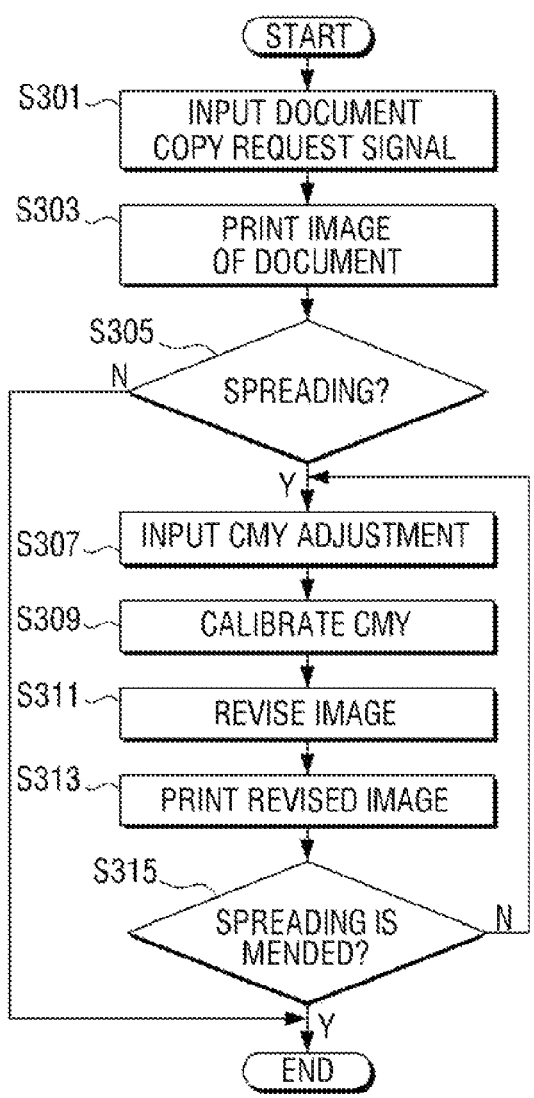
FIG. 6 is a flowchart outlining a method for revising image spreading according to an exemplary embodiment of the present invention.

FIG. 6 is a flowchart outlining a method for revising image spreading according to an exemplary embodiment of the present invention. When the request signal for copying the document is input through the user interface 170 (S301), the document is scanned at the scanner part 110 and output through the printer part 180 (S303). After the document is scanned at the scanner part 110, C, M, Y and K can be calibrated by the black regulator 140 and the color regulator 150.

The user examines the spreading in the printout produced by the printer part 180 (S305). When there is no image spreading (S305-N), separate revision is unnecessary and this process is ended. However, when the printout includes the image spreading (S305-Y), the user inputs the adjustment of C, M and Y using the color level control UI 200 of FIG. 2A (S307).

The CMY adjustment output by the user is fed through the user interface 170. The color regulator 150 calibrates C, M and Y based on the CMY adjustment (S309) and the image reviser 160 finally amends the image (S311).

When the image reviser 160 amends the input, the printer part 180 produces the image (S313). The user checks whether the spreading occurs in the printout (S315). When the spreading is corrected (S315-Y), further revision is unnecessary and this process is finished. When the spreading is not corrected (S315-N), the user inputs the CMY adjustment (S307).

As such, when the document including the black text is copied, the spreading of C, M and Y mixed in the black color can be corrected. By appropriately calibrating the CMYK ratios in the black color, the smooth image can be produced.

In the light of the foregoing, the image revising method, the image forming apparatus, and the method for revising the image spreading resets the black value in the lookup table and calibrates the levels of the colors other than the block in the black area, thus optimizing the black color. Consequently, in the document copy, the natural black color is produced to enhance the legibility of the black text and smoothness of the image without the tone jumping.

While not required in all aspects, aspects of the present invention can be implemented using computer software and/or firmware stored on computer readable media and executed by one or more processors and/or computers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image revising method comprising:
   extracting a brightness of the black area of an input image;
   regulating a black color level in a black area of the input image, the regulating comprising regulating the black color level based on a preset reference black color level by using the extracted brightness of the black area;
   adjusting a color level of at least one other color excluding the black color in the black area;
   compensating for the regulated black color level based on an adjustment of the adjusted color level of the at least one other color; and
   revising the image by applying the compensated black color level and the adjusted color level of the at least one other color.

2. The image revising method of claim 1, wherein a black color level exceeding the reference black color level is regulated to not exceed the reference black color level.

3. The image revising method of claim 2, wherein:
   the regulating of the black color level comprises determining whether the black color level in the black area exceeds the reference black color level by using the extracted brightness of the black area.

4. The image revising method of claim 1, wherein the adjusting of the color level comprises lowering the color level of each color at a preset removal ratio in a sequential order of magenta, cyan, and yellow.

5. The image revising method of claim 1, further comprising:
outputting the revised image;
inputting an adjustment of the at least one other color excluding the black based on color misregistration error per color of the output revised image;
calibrating the at least one other color excluding the black color based on the input adjustment; and
revising the output revised image by applying the calibrated at least one other color.

6. The image revising method of claim 5, wherein the adjustment is input according to a separation degree of each color from an outline of the black area, among the at least one other color excluding the black color.

7. The image revising method of claim 5, wherein the other color levels are calibrated based on the following equation:

$$P'_r = P_r + G(S_r) \times (1 - P_r)$$
$$C' = C_0 \times P'_r$$
$$M' = M_0 \times P'_r$$
$$Y' = Y_0 \times P'_r$$
if $L < L_{th}$,
$$C_{new} = C' \times \frac{L}{255 - (L \times P_c) + P_{r2}}$$
$$M_{new} = M' \times \frac{L}{255 - (L \times P_m) + P_{r2}}$$
$$Y_{new} = Y' \times \frac{L}{255 - (L \times P_y) + P_{r2}}$$
$$L \geq L_{th},$$
$$C_{new} = C'$$
$$M_{new} = M'$$
$$Y_{new} = Y'$$

where $P_r$ denotes a total CMY adjustment coefficient, $G(S_r)$ denotes a preset Gaussian coefficient, $P_r'$ denotes the total CMY adjustment coefficient in consideration of the Gaussian coefficient, $C_0$, $M_0$, and $Y_0$ denote initial CMY color levels, C', M' and Y' denote the CMY adjusted by $P_r$, $P_c$, and $P_y$ denote an adjustment ratio of the input color levels, L denotes the brightness value of the black area, $L_{th}$ denotes an adjusted black color level, $P_{r2}$ denotes an additional CMY adjustment coefficient over the preset initial black color level, and $C_{new}$, $M_{new}$, and $Y_{new}$ denote the adjusted CMY.

8. The image revising method of claim 1, wherein the black color level is compensated based on the following equation:

$$C_{diff} = C_0 - C_{new}$$
$$M_{diff} = M_0 - M_{new}$$
$$Y_{diff} = Y_0 - Y_{new}$$
$$CMY_{max} = MAX(C_{diff}, M_{diff}, Y_{diff})$$
$$K_{new} = K_0 + P_k \times CMY_{max}$$

where $C_0$, $M_0$, $Y_0$ and $K_0$ denote initial CMYK color level, $C_{new}$, $M_{new}$, $Y_{new}$ and $K_{new}$ denote the regulated CMYK, $C_{diff}$, $M_{diff}$ and $Y_{diff}$ denote the CMY adjustment, and $P_k$ denotes a preset black compensation coefficient.

9. An image forming apparatus comprising:
a brightness extractor to extract a brightness of the black area of an input image;
a black regulator to regulate a black color level in a black area of the input image, the black regulator regulating the black color level based on a preset reference black color level by using the extracted brightness of the black area;
a color regulator to adjust other color levels of at least one other colors excluding the black color in the black area; and
an image reviser to revise the image by applying the regulated black color level and the adjusted other color levels to the input image,
wherein the black regulator compensates for the black color level based on an adjustment of the adjusted color level of the al least one color, and
the image reviser revises the image by further applying the compensated black color level.

10. The image forming apparatus of claim 9, wherein the black regulator regulates a black color level exceeding the reference black color level so as to not exceed the reference black color level.

11. The image forming apparatus of claim 10, wherein:
the black regulator determines whether the black color level in the black area exceeds the reference black color level by using the brightness extracted by the brightness extractor.

12. The image forming apparatus of claim 9, wherein the color regulator lowers the other color levels of each other color at a preset removal ratio in a sequential order of magenta, cyan, and yellow.

13. The image forming apparatus of claim 9, further comprising:
a printer part to output the revised image; and
a user interface to input an adjustment of the other colors excluding the black color based on color misregistration error per color of the output revised image,
wherein the color regulator calibrates the other colors excluding the black color based on the input adjustment, and
the image reviser revises the output revised image by applying the calibrated other colors.

14. The image forming apparatus of claim 13, wherein the adjustment is input according to separation degree of each color from an outline of the black area, among the other colors excluding the black color.

15. The image forming apparatus of claim 13, wherein the color regulator calibrates the other color levels based on the following equation:

$$P'_r = P_r + G(S_r) \times (1 - P_r)$$
$$C' = C_0 \times P'_r$$
$$M' = M_0 \times P'_r$$
$$Y' = Y_0 \times P'_r$$
if $L < L_{th}$,
$$C_{new} = C' \times \frac{L}{255 - (L \times P_c) + P_{r2}}$$

$$M_{new} = M' \times \frac{L}{255 - (L \times P_m) + P_{r2}}$$

$$Y_{new} = Y' \times \frac{L}{255 - (L \times P_y) + P_{r2}}$$

$$L \geq L_{th},$$

$$C_{new} = C'$$

$$M_{new} = M'$$

$$Y_{new} = Y'$$

where $P_r$ denotes a total CMY adjustment coefficient, $G(S_r)$ denotes a preset Gaussian coefficient, $P_r'$ denotes the total CMY adjustment coefficient in consideration of the Gaussian coefficient, $C_0$, $M_0$, and $Y_0$ denote initial CMY color levels, C', M' and Y' denote the CMY adjusted by $P_r$, $P_c$, $P_m$, and $P_y$ denote an adjustment ratio of the input color levels, L denotes the brightness value of the black area, $L_{th}$ denotes an adjusted black color level, $P_{r2}$ denotes an additional CMY adjustment coefficient over the preset initial black color level, and $C_{new}$, $M_{new}$ and $Y_{new}$ denote the adjusted CMY.

16. The image forming apparatus of claim 9, wherein the black regulator compensates the black color level based on the following equation:

$$C_{diff} = C_0 - C_{new}$$

$$M_{diff} = M_0 - M_{new}$$

$$Y_{diff} = Y_0 - Y_{new}$$

$$CMY_{max} = MAX(C_{diff}, M_{diff}, Y_{diff})$$

$$K_{new} = K_0 + P_k \times CMY_{max}$$

where $C_0$, $M_0$, $Y_0$ and $K_0$ denote initial CMYK color level, $C_{new}$, $M_{new}$, $Y_{new}$, and $K_{new}$ denote a regulated CMYK, $C_{diff}$, $M_{diff}$ and $Y_{diff}$ denote the CMY adjustment, and $P_k$ denotes a preset black compensation coefficient.

* * * * *